United States Patent [19]
Baba et al.

[11] Patent Number: 6,085,598
[45] Date of Patent: Jul. 11, 2000

[54] PRESSURE SENSOR DEVICE HAVING BREAKABLE MOUNTING MEMBER

[75] Inventors: Hironobu Baba, Obu; Michitaka Hayashi, Nagoya; Masaki Takakuwa, Toyohashi; Masahito Imai, Chita; Akiteru Takae; Tokuhisa Nomura, both of Toyota; Akira Ishimaru, Nishikamo-gun, all of Japan

[73] Assignee: Denso Corporation, Kariya, Japan

[21] Appl. No.: 09/342,624

[22] Filed: Jun. 29, 1999

[30] Foreign Application Priority Data

Feb. 22, 1999 [JP] Japan ................... 11-043746

[51] Int. Cl.⁷ ................ G01L 7/00; G01L 7/08
[52] U.S. Cl. .................... 73/756; 73/715
[58] Field of Search ............ 73/715, 723, 754, 73/756

[56] References Cited

U.S. PATENT DOCUMENTS 4,342,231  8/1982  Yamamoto et al. ........... 73/721
5,747,694  5/1998  Baba et al. ................. 73/723

FOREIGN PATENT DOCUMENTS 9-76771  3/1997  Japan .

*Primary Examiner*—William Oen
*Assistant Examiner*—Abdullahi Aw-musse
*Attorney, Agent, or Firm*—Pillsbury Madison & Sutro LLP

[57] ABSTRACT

A pressure sensor portion having a pressure-responsive element for detecting gas pressure in reference to the atmospheric pressure is connected to a mounting body such as a canister mounted on a vehicle by means of a fragile connecting member. The connecting member breaks off to dismount the sensor device from the mounting body when a high impact due to an accidental collision or crash is imposed on the sensor device, and thereby an inlet port connected to the sensor portion for introducing gas pressure thereinto is prevented from being broken or damaged by such a collision impact. The fragile connecting member may include a tubular pipe formed integrally with a cover that hermetically closes an inner cavity of the sensor portion. A mounting bracket connected to the sensor portion via the fragile connecting member may be used to mount the sensor device on the mounting body.

17 Claims, 13 Drawing Sheets

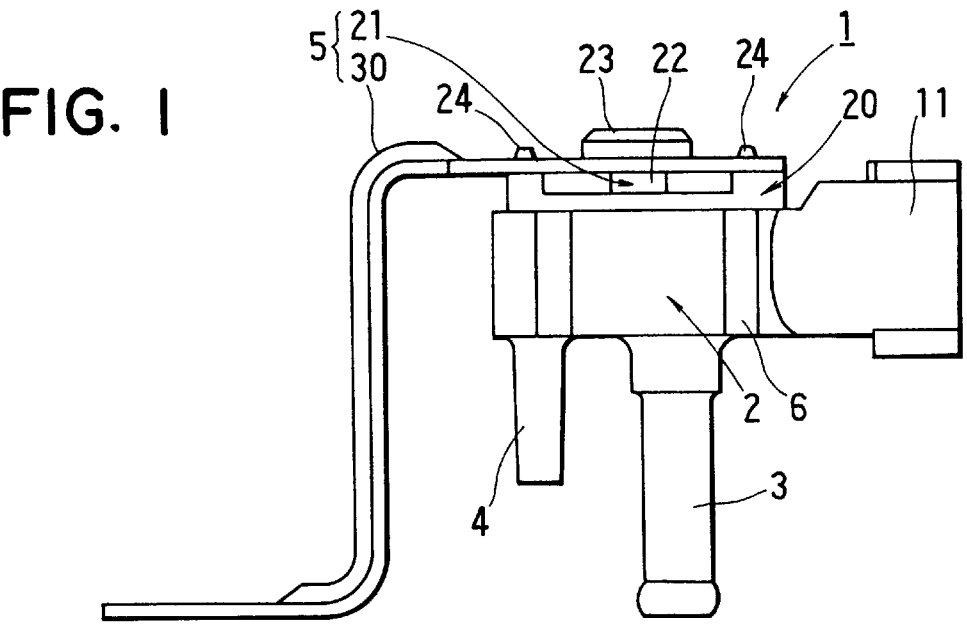
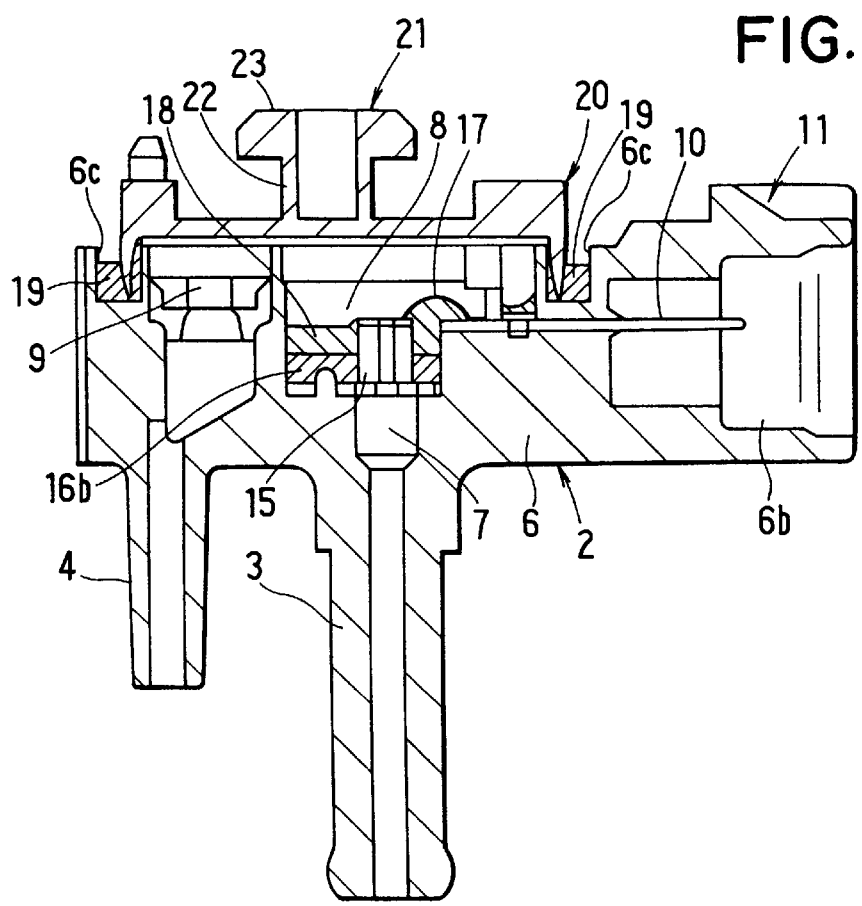

| DIRECTION OF FORCE | MAXIMUM STRESS IN INLET PORT 3 (kgf/mm²) (X) | MAXIMUM STRESS IN BRIDGE 22 (kgf/mm²) (Y) | MAXIMUM STRESS IN STUB 24 (kgf/mm²) (Z) | Y/X | Z/X |
|---|---|---|---|---|---|
| D | 0.42 | 1.16 | 0.40 | 2.8 | 1.0 |
| E | 0.33 | 1.01 | 0.40 | 3.1 | 1.2 |
| F | 0.40 | 1.15 | 0.36 | 2.9 | 0.9 |

| DIRECTION OF FORCE | MAXIMUM STRESS IN INLET PORT 3 (kgf/mm²) (X) | MAXIMUM STRESS IN BRIDGE 22 (kgf/mm²) (Y) | MAXIMUM STRESS IN STUB 24 (kgf/mm²) (Z) | Y/X | Z/X |
|---|---|---|---|---|---|
| D | 0.40 | 1.40 | 0.63 | 3.5 | 1.6 |
| E | 0.32 | 1.18 | 0.63 | 3.7 | 2.0 |
| F | 0.38 | 1.47 | 0.42 | 3.9 | 1.1 |

FIG. 12
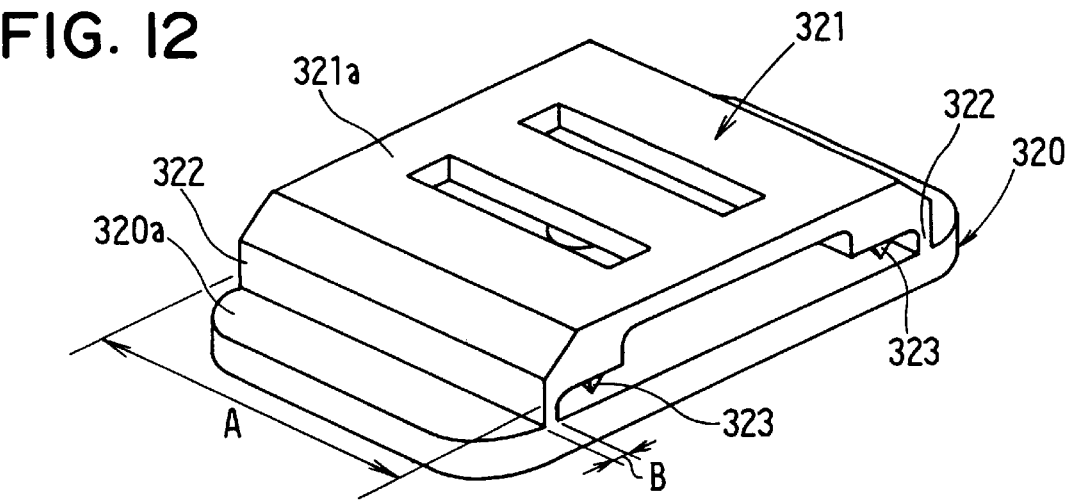
FIG. 13A
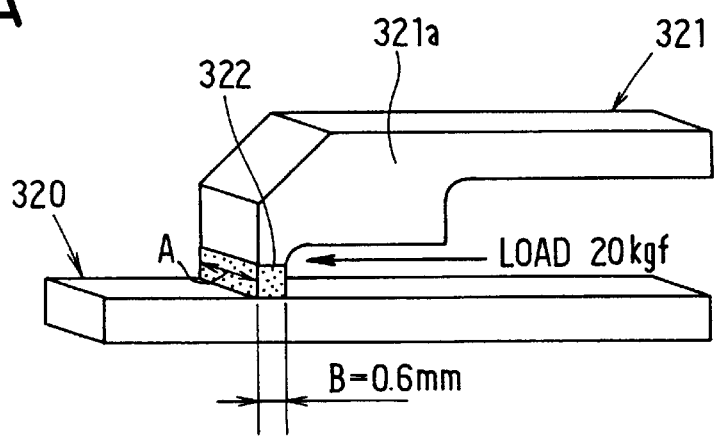
FIG. 13B
| WIDTH A | MAXIMUM STRESS | APPLICABILITY |
|---|---|---|
| 17 mm | 11 kgf/mm$^2$ | × |
| 15 mm | 13.6 kgf/mm$^2$ | ○ |
| 11 mm | 15.6 kgf/mm$^2$ | ○ |
| 7 mm | 21.2 kgf/mm$^2$ | ○ |
PBT TENSILE STRENGTH : 11.9 kgf/mm$^2$

PRESSURE SENSOR DEVICE HAVING BREAKABLE MOUNTING MEMBER

CROSS-REFERENCE TO RELATED APPLICATION

This application is based upon and claims benefit of priority of Japanese Patent Application No. Hei-11-43746 filed on Feb. 22, 1999, the content of which is incorporated herein by reference.

BACKGROUND OF THE INVENTION

1. Field of the Invention

The present invention relates to a pressure sensor device having a breakable mounting member, the sensor device being used in moving vehicles such as automobiles, vessels or airplanes, or in stationary apparatus such as a home gas supplier.

2. Description of Related Art

A pressure sensor device installed in an automobile vehicle for measuring gasoline vapor pressure in a gasoline tank is known hitherto. Generally, this kind of pressure sensor device is composed of a sensor portion for sensing the vapor pressure and an inlet port for introducing the vapor pressure into the sensing portion. In the conventional pressure sensor, the inlet port is connected to a conduit connecting a gasoline tank and a canister for absorbing gasoline vapor. In case the vehicle crashes in accident, the inlet port may be broken.

in consideration of such an accidental breakage of the inlet port of the pressure sensor device, a sensor device shown in FIG. 16 has been proposed and put in the market. The pressure sensor device 200 is composed of a sensor portion 201 having a semiconductor diaphragm pressure-sensitive element 201a and an inlet port portion 202 for introducing gasoline vapor pressure into the sensor portion 201 along a path shown with an arrow "A." The pressure sensor portion 201 and the inlet port portion 202 are connected by a narrowed portion 202a. At a bottom end of the inlet port portion 202, a check valve 202b is installed. The narrowed portion 202a breaks off, separating the sensor portion 201 from the inlet port portion 202, in case the vehicle crashes with a impact higher than a predetermined level (e.g., 30 G). In this instance, atmospheric pressure is introduced into the inlet port, and thereby the check valve 202b is closed to prevent the gasoline vapor from entering the inlet port. Thus, the gasoline vapor is prevented from being introduced into the sensor device in case an accident occurs. However, the conventional device has to include the narrowed portion 202a and the check valve 202b to attain the purpose. Accordingly, the structure of the device becomes complex and the device becomes large in size.

SUMMARY OF THE INVENTION

The present invention has been made in view of the above-mentioned problem, and an object of the present invention is to provide a pressure sensor device in which the inlet pipe is surely prevented from being broken when a high impact is imposed thereon under an accidental crash, and more particularly to provide such a pressure sensor device without making its structure complex and without making it large in size.

According to the present invention, a sensor portion in which a pressure-responsive element is disposed is connected to a bracket for mounting sensor device on a mounting body of a vehicle by means of a connecting member. The connecting member is made fragile so that it breaks off to separate the sensor device from the mounting body when a predetermined level of impact is imposed on the sensor device upon an accidental crash or collision. The sensor portion also includes an inlet port from which gas pressure to be measured is introduced and another inlet port from which the atmospheric pressure as a reference pressure is introduced. The pressure-responsive element detects the gas pressure by comparing it with the reference pressure. Since the sensor device is dismounted from the mounting body due to breakage of the fragile connecting member when a high collision impact is imposed on the sensor device, the sensor portion including the inlet pipe for introducing gas pressure is prevented from being broken or damaged by the collision impact.

The fragile connecting member is connected to an upper surface of the sensor portion while the inlet port is connected to a lower surface of the sensor portion, so that both are apart from each other. The connecting member may be made integrally with a cover that hermetically closes an inner cavity of the sensor portion. The connecting member may be composed of a tubular bridging portion and a head connected to the bridging portion. The bracket is connected to the cover via the connecting member by first inserting the head into an opening formed on the bracket and then turning the bracket around the tubular bridging portion. The connecting member may be made of the same material as the inlet port, and a diameter of the tubular bridging portion is made smaller than that of the inlet port so that the bridging portion is more fragile than the inlet port. The bracket may be fastened also to small additional fragile stubs formed on the cover to ensure a close connection between the bracket and the cover.

Alternatively, the connecting member may be composed of an upper plate disposed in parallel with a cover plate which hermetically closes the inner cavity of the sensor portion and a pair of fragile bridging protions connecting the upper plate to the cover plate. The bracket is inserted into a space between the upper plate and the cover plate and fastened therein by engaging a projection formed on the upper plate with a depression or hole formed on the bracket. The bracket may be press-fitted in the space by pressing triangular stubs formed on the upper plate against the bracket to ensure a close contact thereof.

Since the sensor device of the present invention is mounted on the mounting body by means of the fragile connecting member, the sensor device can be separated from the mounting body when a high collision impact is imposed thereon, and thereby the inlet port for introducing gas pressure into the sensor device is protected from the collision impact. The connecting member structure is simple and no other additional component is required to provide such a protective function against the collision impact.

Other objects and features of the present invention will become more readily apparent from a better understanding of the preferred embodiments described below with reference to the following drawings.

BRIEF DESCRIPTION OF THE DRAWINGS

FIG. 1 is a overall view showing a pressure sensor having a breakable mounting member as a first embodiment of the present invention;

FIG. 2 is a cross-sectional view showing the pressure sensor device shown in FIG. 1, a bracket being removed therefrom;

FIG. 9A is a table showing stress imposed on an inlet port, a bridging portion and a stub formed on the cover, under a simulation where a certain external force is applied in three directions to the sensor device having a bridging portion of an exemplary size;

FIG. 9B is a table showing the same as in FIG. 9A, where a bridging portion of another exemplary size is used;

FIG. 12 is a perspective view showing a cover used in the sensor device shown in FIG. 10;

FIG. 13A is a perspective view showing a piece of the bridging portion for analyzing stress imposed thereon;

FIG. 13B is a table showing stress imposed on the bridging portion having various widths;

Figure 3A:
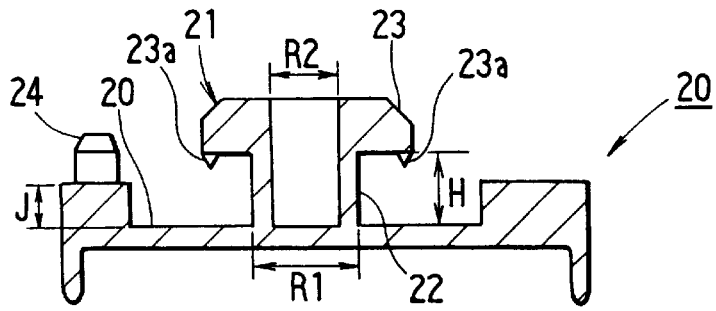
FIG. 3A is a cross-sectional view showing a cover of a sensor portion of the device shown in FIG. 2.

DETAILED DESCRIPTION OF THE PREFERRED EMBODIMENTS (First embodiment)

A first embodiment of the present invention will be described with reference to FIGS. 1–8. As shown in FIG. 1, a pressure sensor device 1 is composed of a sensor portion 2, an inlet port 3 for introducing pressure to be measured into the sensor portion 2, another inlet port 4 for introducing the atmospheric pressure as a reference pressure, and a mounting member 5 for mounting the pressure sensor on a mounting body of an automotive vehicle. The mounting member 5 is composed of a bracket 30 and a connecting member 21 formed on a cover 20 which covers a housing 6 of the sensor portion 2. The housing 6 also includes a connector 11. The connecting member 21 formed on the cover 20 includes a bridging portion 22 and a head 23 connected to the bridging portion 22. A pair of stubs 24 are also formed on the cover 20.

Figure 3B:
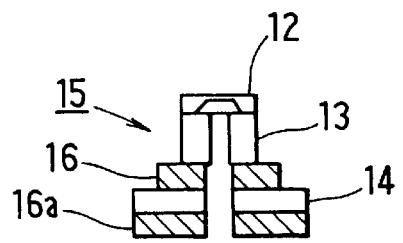
FIG. 3B is a cross-sectional view showing a sensor element of the sensor portion shown in FIG. 2.
Figure 3C:
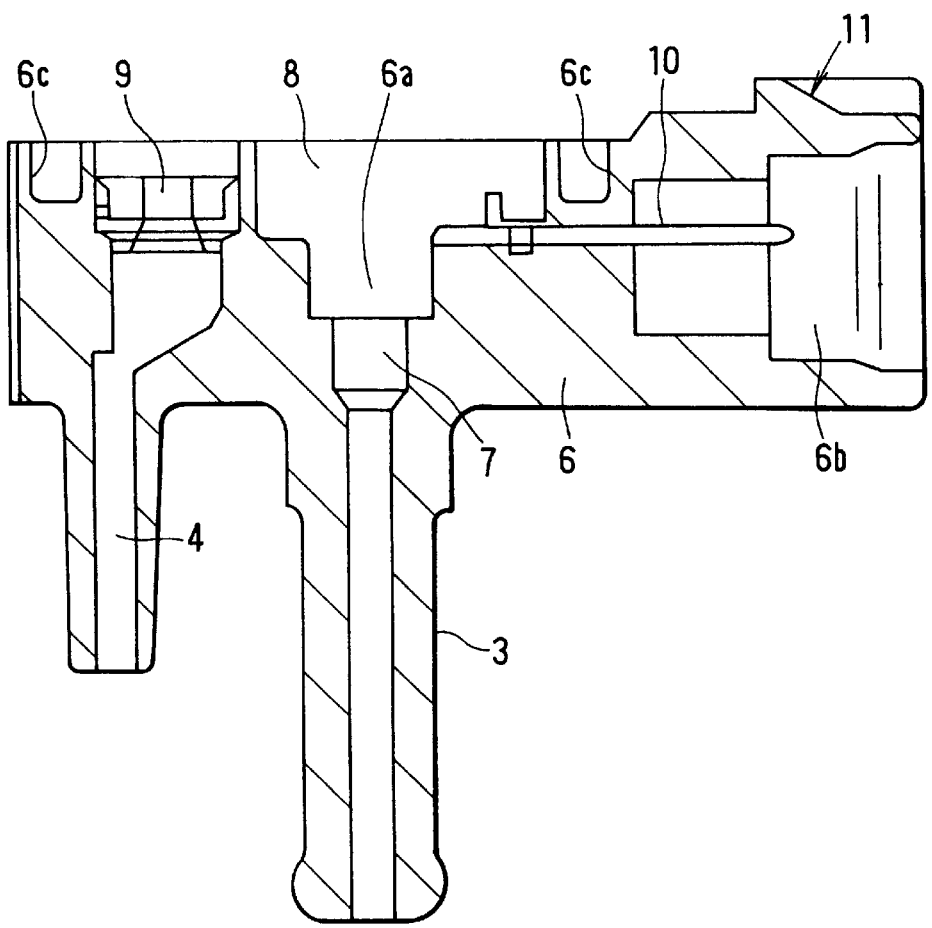
FIG. 3C is a cross-sectional view showing a housing of the sensor portion shown in FIG. 2.

Details of the pressure sensor device are shown in FIGS. 2, 3A, 3B and 3C. The housing 6 is made of a synthetic resin material (e.g., a PBT resin with 30% glass filler). The tube-shaped inlet ports 3 and 4 extending downwardly are integrally formed with the housing 6. A cavity 6a for mounting a sensor element 15 is also formed in the housing 6 as shown in FIG. 3C. A pressure chamber 7 to which a pressure to be measured (e.g., a gasoline vapor pressure introduced from a conduit connecting a gasoline tank and a canister) is introduced through the inlet port 3 is formed between the cavity 6a and the inlet port 3. A reference pressure chamber 8 to which the atmospheric pressure is introduced through the inlet port 4 is also formed in the housing 6. The pressure chamber 7 and the reference pressure chamber 8 are divided by a pressure-responsive element 12 of the sensor element 15. A water repellent filter 9 is disposed at an upper end of the inlet port 4. Terminals 10 for conducting electrical signals from the sensor element 15 to an outside circuit are disposed in the connector 11 of the housing 6. A connector housing 6b for receiving an outside connector therein is formed in the connector 11.

As shown in FIG. 3B, the sensor element 15 is composed of the pressure-responsive element 12 which is a diaphragm made of single crystal silicon, a glass base 13 and a metallic stem 14 (made of, e.g., 42 alloy). The pressure-responsive element 12 is hermetically connected to the glass base 13 by anode bonding. The glass base 13 is bonded on the stem 14 with a fluorine-based adhesive 16 hardened by heating. The stem 14 is bonded on the bottom surface of the cavity 6a with the same fluorine-based adhesive 16a. Thus, the sensor element 15 is fixed in the cavity 6a. As shown in FIG. 2, the terminals 10 and electrodes (not shown) of the pressure-responsive element 12 are connected through wires 17 by wire bonding. Fluorine-based adhesive 16b is disposed on the stem 14 and hardened. Then, the hardened fluorine-based adhesive 16b, the wires 17 and the sensor element 15 are covered by silicone gel 18, and the silicone gel 18 is hardened by heating. Finally, the upper opening of the housing 6 is hermetically covered by the cover 20, an outer periphery of which is fixed by an adhesive 19 disposed in a groove 6c of the housing 6.

Figure 4A:
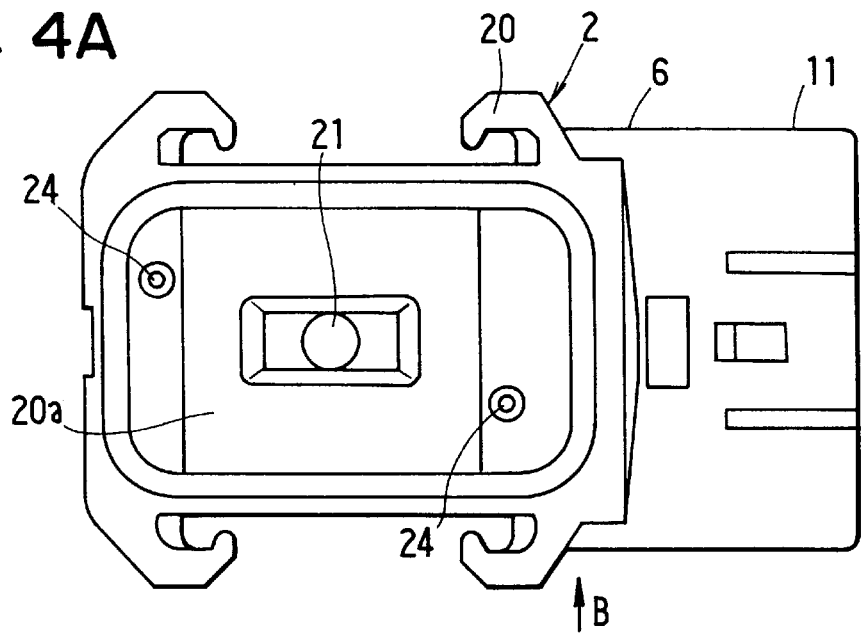
FIG. 4A is a top view showing the sensor device shown in FIG. 2.
Figure 4B:
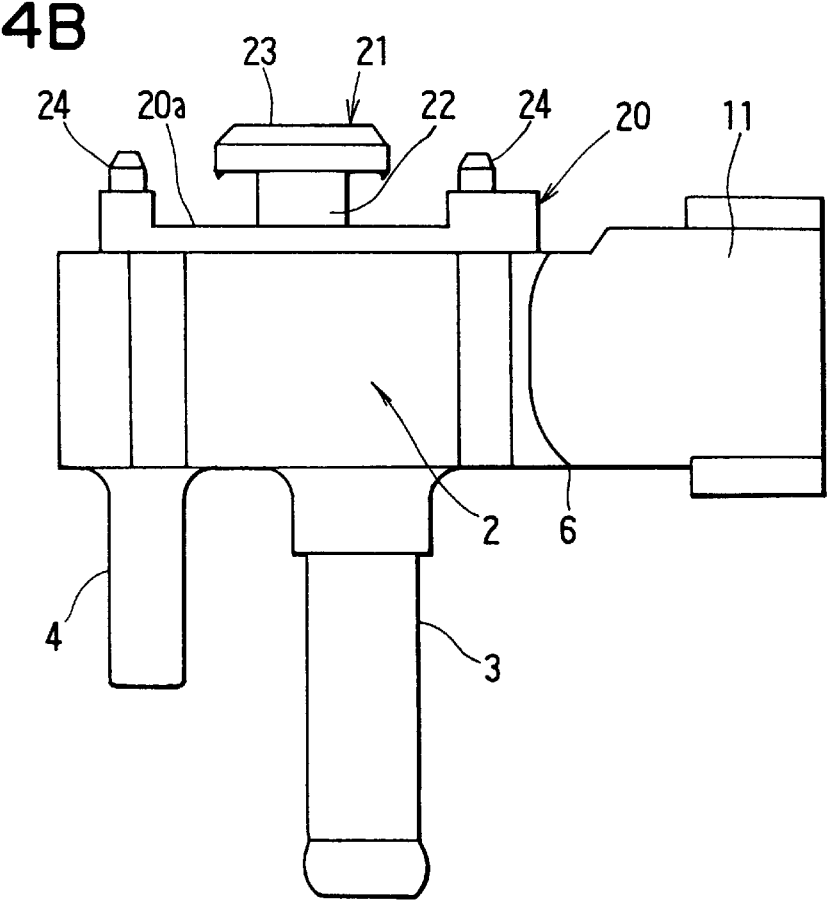
FIG. 4B is a side view showing the sensor device shown in FIG. 4A, viewed from a direction of an arrow "B" in FIG. 4A.
Figure 5:
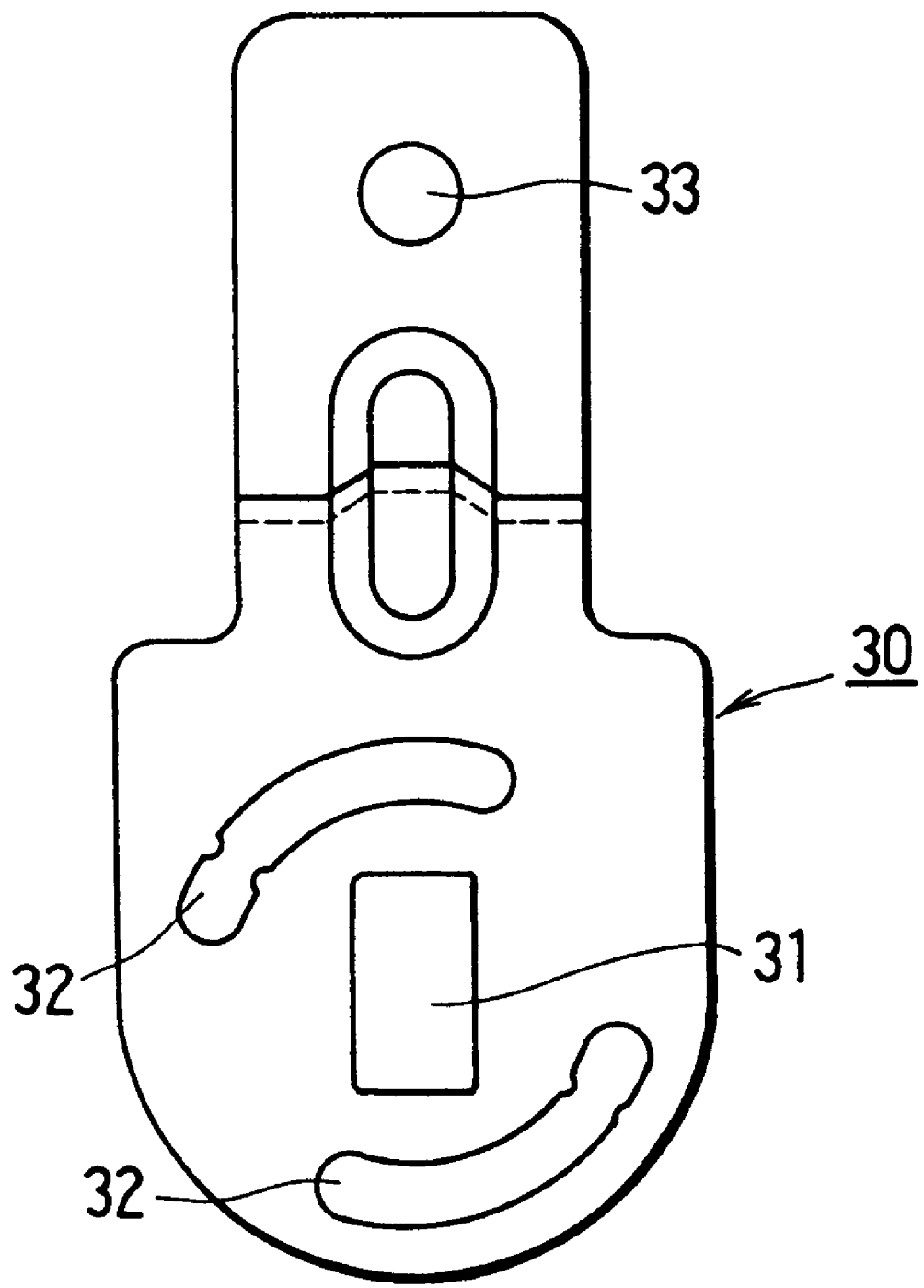
FIG. 5 is a plan view showing a bracket for mounting the sensor device on a mounting body.

Referring to FIGS. 4A–6B, the mounting member 5 will be described. The sensor portion 2 is connected to the bracket 30 by the connecting member 21 and a pair of stubs 24. The bracket 30 is fixed to a mounting body such as a canister 51 (refer to FIG. 7B). FIG. 4A is a top view of the sensor device with the bracket 30 removed therefrom, and FIG. 4B is a side view of FIG. 4A. FIG. 5 is a plan view of the bracket 30 to be connected to the sensor portion 2 by the connecting member 21. The connecting member 21 is integrally formed with the cover 20 and consists of a bridging portion 22 and a head 23. The connecting member 21 is mushroom-shaped as a whole. A pair of stubs 24 are also integrally formed with the cover 20 as shown in FIGS. 4A and 4B. The cover 20 including the connecting member 21 and stubs 24 is made of a synthetic resin (e.g., a PBT resin with 30% glass filler).

The connecting member 21 is structured so that it is more easily breakable than the inlet port 3. That is, the connecting member 21 breaks off before the inlet port 3 does, when a predetermined level of impact is imposed on the sensor portion 2 due to an accidental collision or crash. Thus, the inlet port 3 is protected from being broken off by the collision impact. For this purpose, the outer diameter of the bridging portion 22 is made smaller than that of the inlet pipe 3. The bridging portion 21 may break off at its middle portion, a junction to the head 23 or a junction to the upper surface of the cover 20. The sensor portion 2 can be separated from the mounting body before the inlet port 3 is damaged or broken by a collision impact, because the bridging portion 22 breaks off more easily than the inlet port 3 (refer to FIG. 8).

Dimensions of the bridging portion 22, that is, an outer diameter R1, an inner diameter R2 and a height H shown in FIG. 3A, are determined by a simulation which will be described later. A difference between height J and height H (both shown in FIG. 3A) is substantially the same as a thickness of the bracket 30. The ensure secure fastening of the bracket 30 to the connecting member 21, triangular ribs 23a stick out downwardly from the head 23.

FIG. 5 shows an example of the bracket 30 to be connected to the connecting member 21. The bracket 30 is made of a steel plate by presswork. A rectangular opening 31 is formed on the bracket 30, through which the head 23 of the connecting member 21 is inserted. A pair of arcuate openings 32 each of which engages with the stub 24 are also formed on the bracket 30. The arcuate opening 32 includes a narrowed portion for keeping the bracket 30 in position when the stub 24 engages with the arcuate opening 32. A mounting hole 33 is formed at an end of the bracket 30, through which a mounting bolt 40 is inserted to mount the sensor device on a mounting body 51 (refer to FIG. 7B).

Figure 6A:
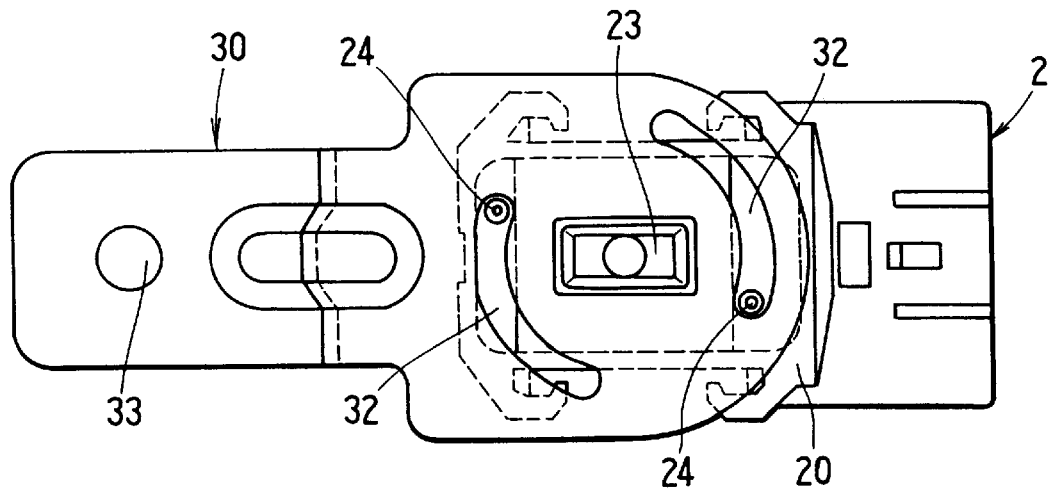
FIG. 6A is a plan view showing the sensor device with the bracket attached thereto.
Figure 6B:
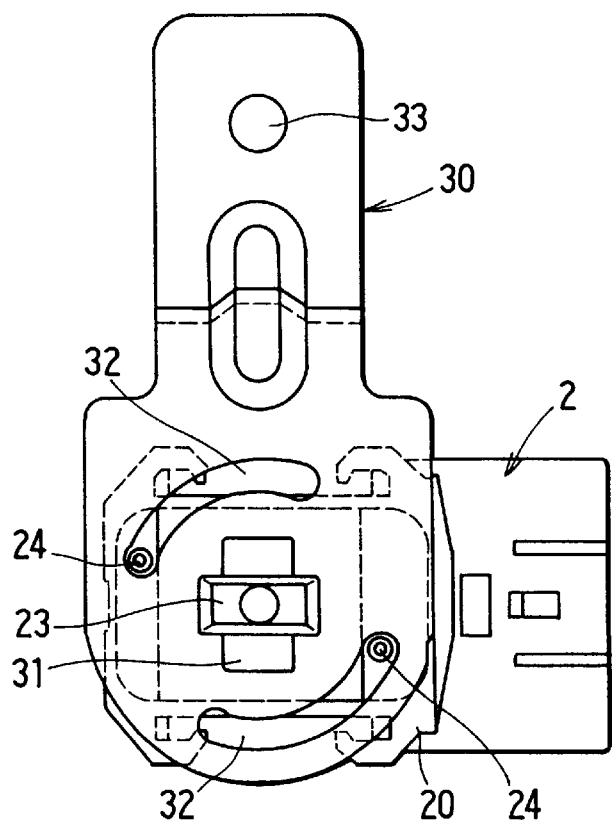
FIG. 6B is a plan view showing the sensor device with the bracket fixed thereto by turning the bracket 90-degree from the position shown in FIG. 6A.

FIGS. 6A and 6B show a process for connecting the bracket 30 to the sensor portion 2. First, the head 23 and the stubs 24 are inserted into the rectangular opening 31 and the arcuate openings 32, respectively, at a position shown in FIG. 6A. Then, the bracket 30 is rotated clockwise by 90-degree to a position shown in FIG. 6B, so that the head 30 engages with the rectangular opening 31 and each stub 24 is accommodated in each position. The bracket 30 is fixed between the cover 20 and the head 23 and further fastened to the pair of stubs 24. Thus, the sensor portion 2 is connected to the bracket 30 via the connecting member 21. As described above, the bracket 30 and the sensor portion 2 are easily assembled without using any special jig.

Figure 7A:
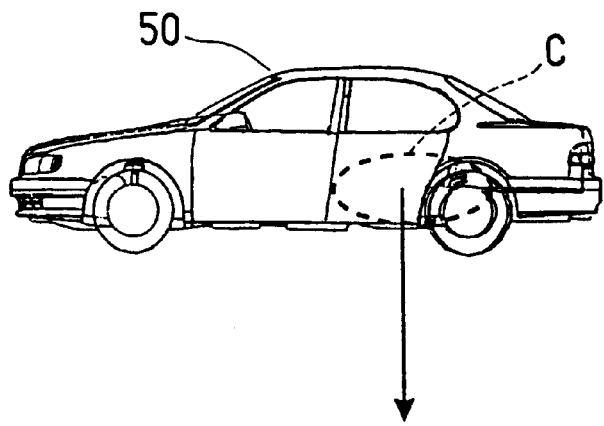
FIG. 7A is a schematic view showing a position "C" in an automobile where the sensor device is installed.
Figure 7B:
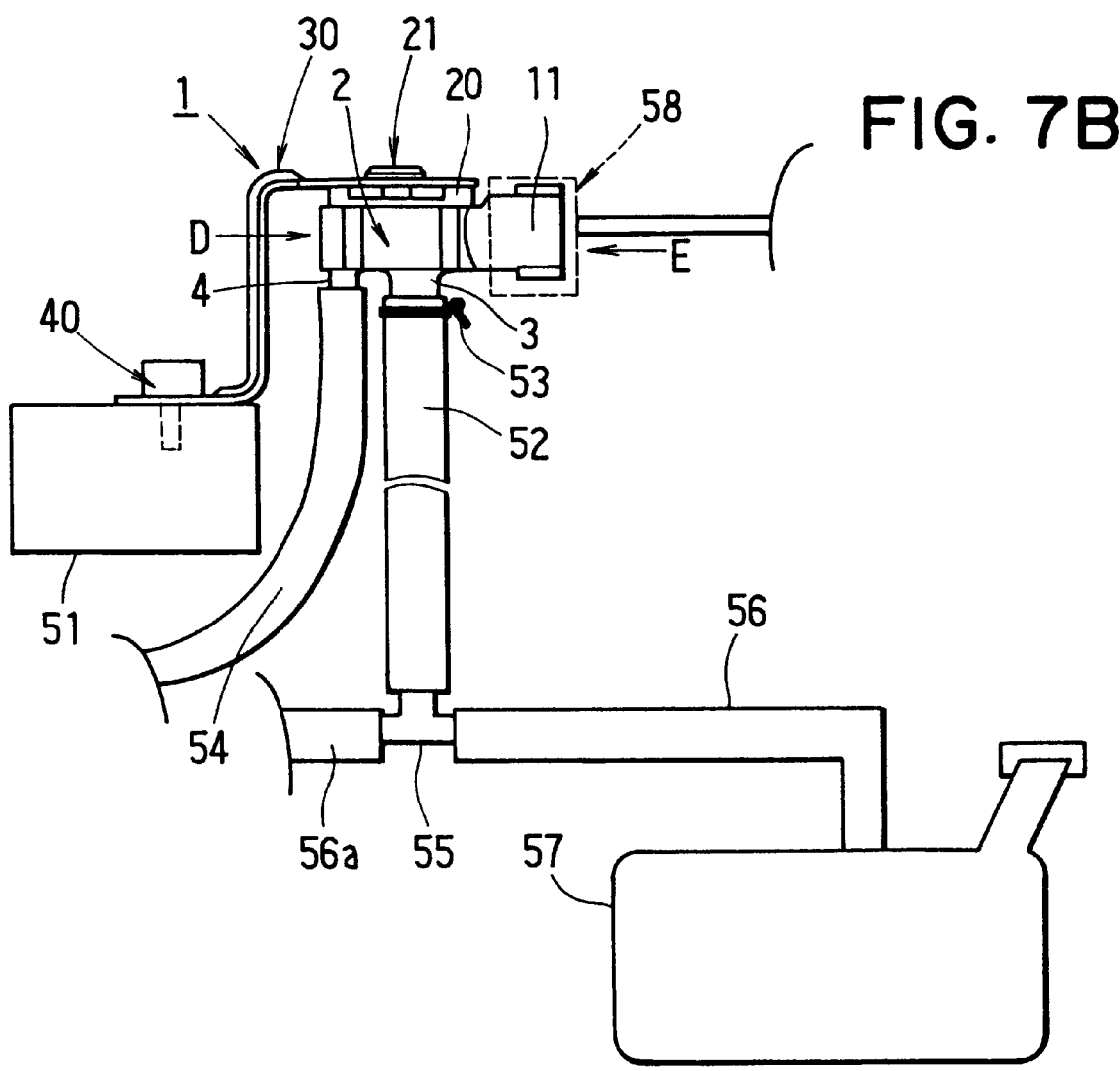
FIG. 7B is a schematic view showing how the sensor device is installed in the automobile.

FIG. 7A shows an automobile on which the sensor device 1 is mounted. The sensor device 1 is mounted on the automobile at a position encircled by a dotted line "C." FIG. 7B shows how the sensor device 1 is mounted on and connected to other parts of the automobile. The sensor device 1 is mounted on a canister 51 with a bolt 40. The inlet port 3 is inserted into a rubber tube 52 and fixed thereto with a clip 53. Gasoline vapor in a gasoline tank 57 is led to the canister 51 through a conduit 56 and a rubber tube 56a. A T-shaped joint 55 connecting the conduit 56 and the rubber tube 56a is also connected to the rubber tube 52. The inlet port 4 for introducing the atmospheric pressure is connected to a rubber tube 54, an opening of which is located at a position where water does not introduced therein. The sensor device 1 is electrically connected through the connector 11 and an outer connector 58 to an electronic control unit for controlling operation of an engine.

Figure 8:
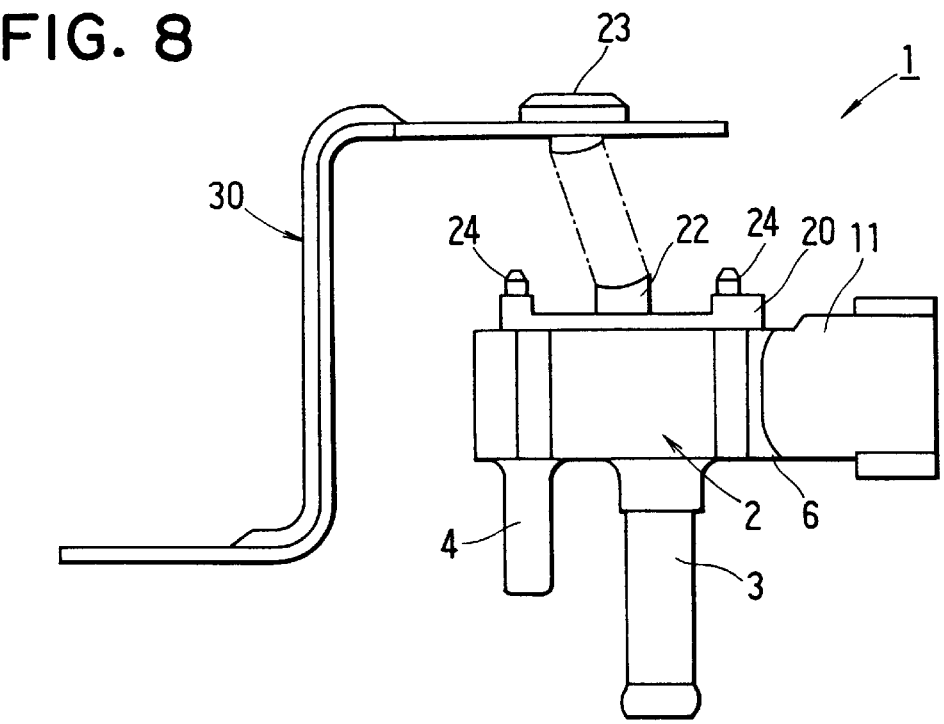
FIG. 8 is a side view showing the sensor device separated from the mounting bracket by breakage of the breakable mounting member.

When the vehicle equipped with the sensor device 1 described above collides with another vehicle or other obstacles in a direction "D" shown in FIG. 7B (a frontward collision), a collision impact is imposed on the sensor portion 2 in the direction D. Similarly, when the vehicle collides with backward obstacles (a backward collision), a collision impact is imposed in the direction "E" shown in FIG. 7B. When the vehicle collides with obstacles in a direction perpendicular to a driving direction (a side collision), a collision impact is imposed on the sensor device in a horizontal direction (herein after referred to direction F). When such collisions in any direction occur, the connecting member 21 first breaks off, and the sensor portion 2 is separated from the mounting bracket 30 as shown in FIG. 8. In this manner, the inlet port 3 introducing fuel pressure into the sensor portion 2 is protected from being broken by the collision impact. Also, the rubber tube connections are not damaged by the collision impact.

Stresses imposed on the inlet port 3, the bridging portion 22 and the stub 24 by the collision impact are analyzed under simulation. The results of the simulation analysis are shown in FIGS. 9A and 9B. The simulation analysis shown in FIG. 9A is conducted for the bridging portion 22 having an outer diameter R1=5 mm, an inner diameter R2=0 mm, and a height H=4.8 mm. The simulation analysis shown in FIG. 9B is conducted for the bridging portion 22 having an outer diameter R1=5 mm, an inner diameter R2=3.4 mm, and a height H=3.4 mm. It is assumed that a same collision impact force of 3.8 kgf is imposed on the sensor housing 6 in each direction, D, E or F. In FIGS. 9A and 9B, "X" denotes a maximum main stress imposed on the inlet port 3 in terms of $kgf/mm^2$, "Y" a maximum main stress imposed on the bridging portion 22, and "Z" a maximum main stress imposed on the stub 24.

If Y is larger than X, the bridging portion 22 breaks off more easily than the inlet port 3. Similarly, if Z is larger than X, the stub 24 breaks off more easily than the inlet port 3. The bridging portion 22 has to be structured so that it is more fragile than the inlet port 3. In the case of FIG. 9A, Z is smaller than X when the impact force is applied in directions D and F, while Y is always larger than X. In the case of FIG. 9B, both Y and Z are always larger than X when the impact force is applied in any direction, and Y is always the largest of all. This means that the bridging portion 22 breaks off first, thus protecting the inlet port 3 from being damaged by the collision impact.

The housing 6 including the inlet port 3 and the cover 20 including the bridging portion 22 are made of the same synthetic resin, and the outer diameter of the inlet port 3 is larger than the outer diameter of the bridging portion 22. Therefore, the bridging portion 22 is more easily breakable then the inlet port 3. The wall thickness of the bridging portion 22 is made about the same as that of the inlet port 3, preferably, thinner than the wall thickness of the inlet port 3. The bracket 30 is connected to the cover 20 via the connecting member 21. In addition, the bracket 30 is secured to the cover 20 by inserting the pair of stubs 24 in the arcuate openings 32 and by abutting the triangular ribs 23a against the bracket 30. Therefore, the collision impact is surely imposed on the bridging portion 22, and thereby the bridging portion 22 is broken off without fail when a collision impact higher than a predetermined level is applied to the sensor device.

The sensor device may be mounted directly on the mounting body without using the bracket 30. In this case, the connecting member 21 having the bridging portion 22 directly connects the sensor portion 2 to the mounting body 51, and the bridging portion 22 breaks off when the collision impact higher than a predetermined level is imposed on the sensor device.

Figure 14A:
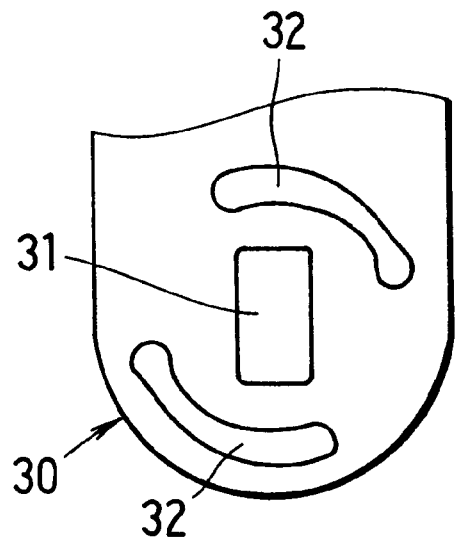
FIGS. 14A, 14B, 14C and 14D are partial plan views showing the bracket to be used in the first embodiment, each having a modified form of arcuate openings.
Figure 14B:
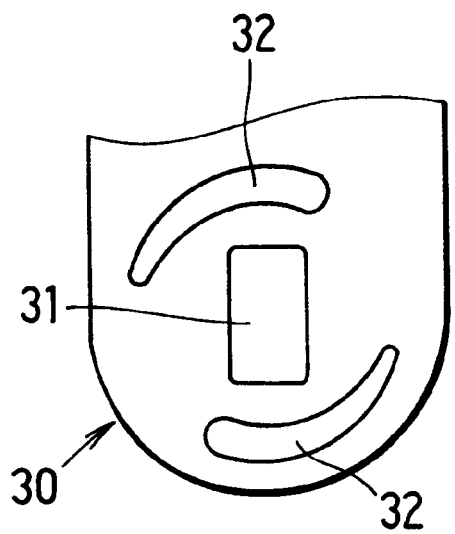
Figure 14C:
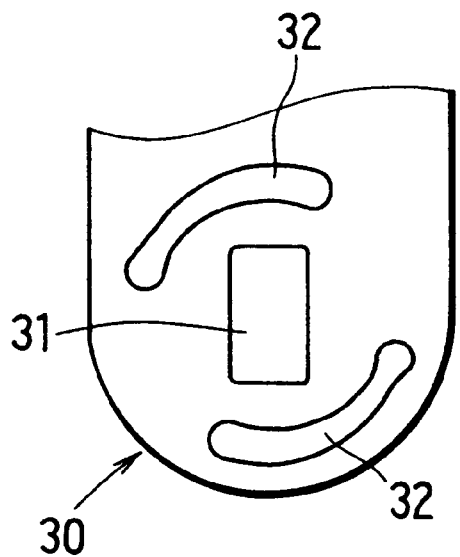
Figure 14D:
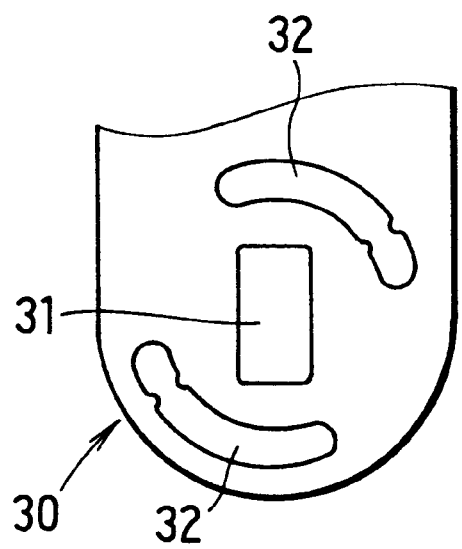

The arcuate openings 32 formed on the bracket 30 shown in FIG. 5 may be modified in the forms shown in FIGS. 14A–14D. The arcuate openings 32 shown in FIG. 14A have no portion abruptly narrowed. Instead, the width of the arcuate opening 32 gradually varies so that a narrowest portion is formed in the arcuate opening 32 to restrict rotation of the bracket 30 relative to the stub 24. The brackets 30 shown in FIGS. 14B and 14C have a pair of arcuate openings 32 formed at a place different from that of the brackets shown in FIGS. 5 and 14A. That is, the arcuate openings 32 take a position which is symmetrical to the position of the openings shown in FIGS. 5 and 14A with respect to a longitudinal direction of the bracket 30. The brackets shown in FIGS. 14B and 14C are rotated counter-clockwise by 90-degree when they are mounted on and connected to the connecting member 21. The arcuate openings 32 of the bracket shown in FIG. 14C are shaped in the same manner as those shown in FIG. 14A. The arcuate openings 32 of the bracket 30 shown in FIG. 14D are modified so that they are widest at one end and are gradually narrowed to become narrowest at the other end.

Figure 15A:
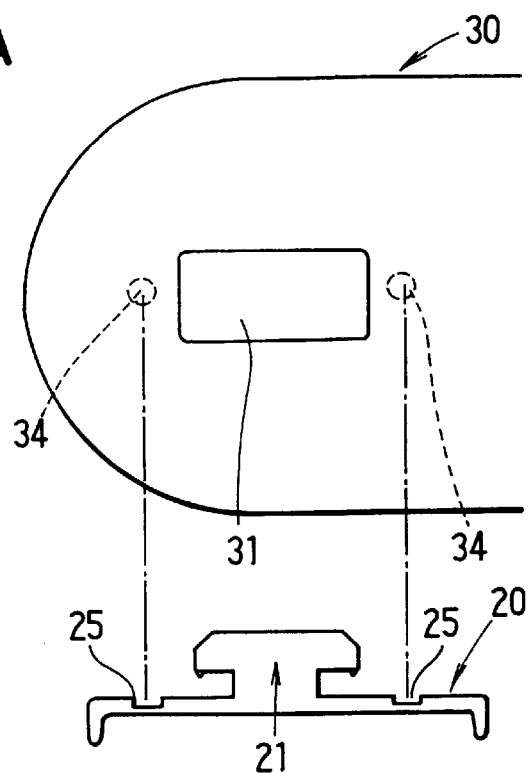
FIGS. 15A and 15B are views showing modified forms of connection of the cover and the bracket in the first embodiment.
Figure 15B:
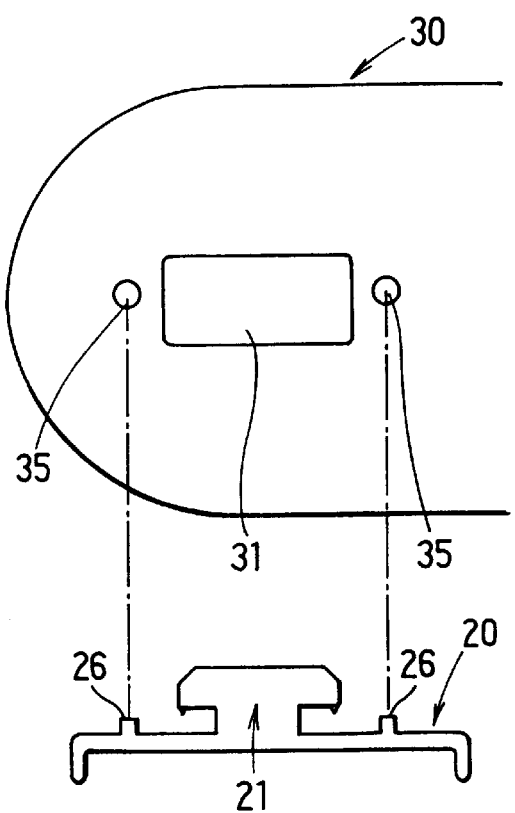
Figure 16:
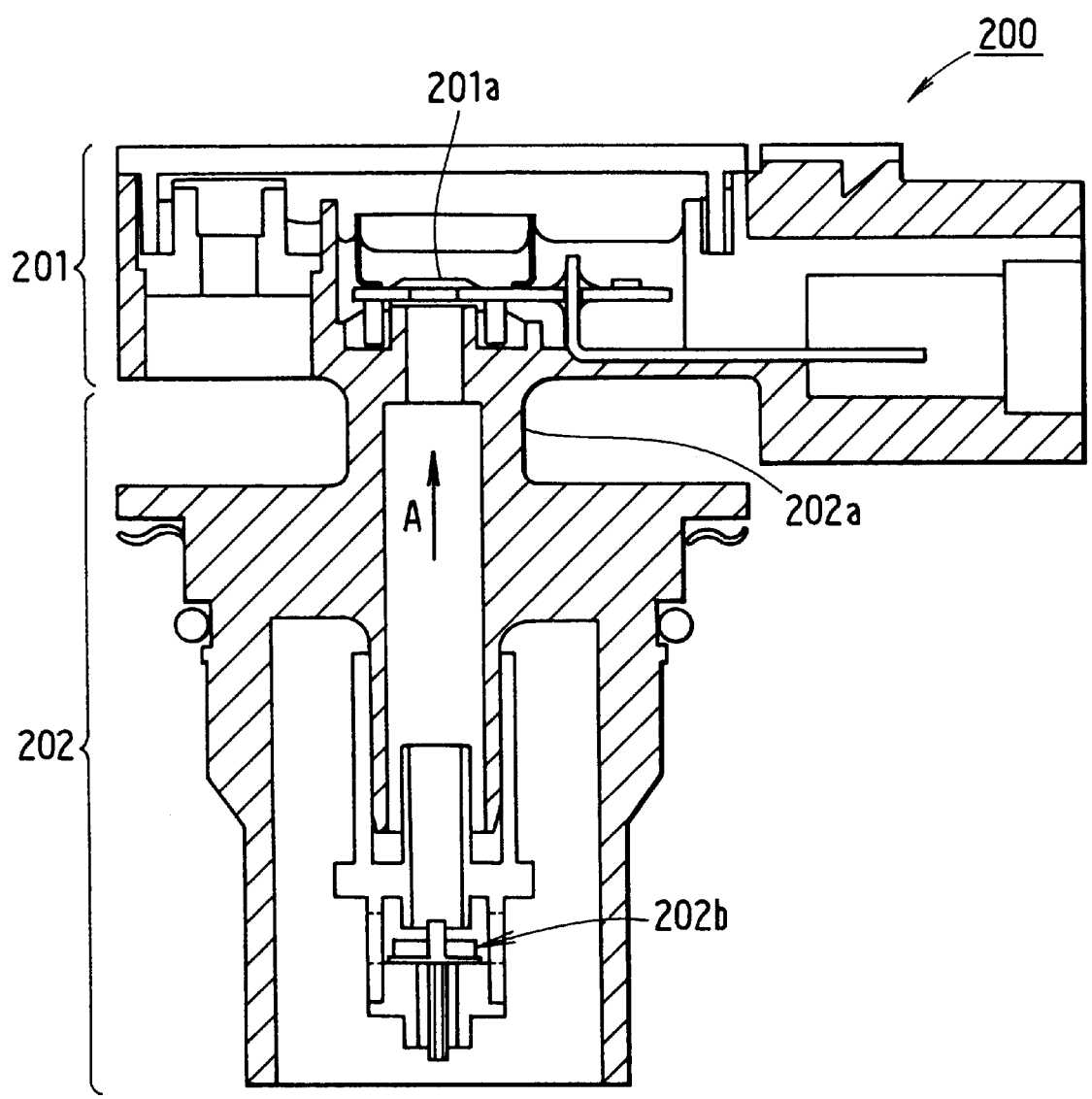
FIG. 16 is a cross-sectional view showing a conventional pressure sensor device.

The shape of the head 23 may be modified in various forms, as long as it is not round, and can be inserted into the rectangular opening 31 and securely fastened to the bracket 30. The pair of stubs 24 formed on the cover 20 and the pair of arcuate openings 32 formed on the bracket 30 may be eliminated. In this case, as shown in FIG. 15A, a pair of positioning stubs 34 which fit with a pair of depressions 25 formed on the cover 20 are formed on the bracket 30. Alternatively, as shown in FIG. 15B, a pair of positioning holes 35 which receive a pair of projections 26 formed on the cover 20 may be made on the bracket 30.

(Second embodiment)

Figure 10:
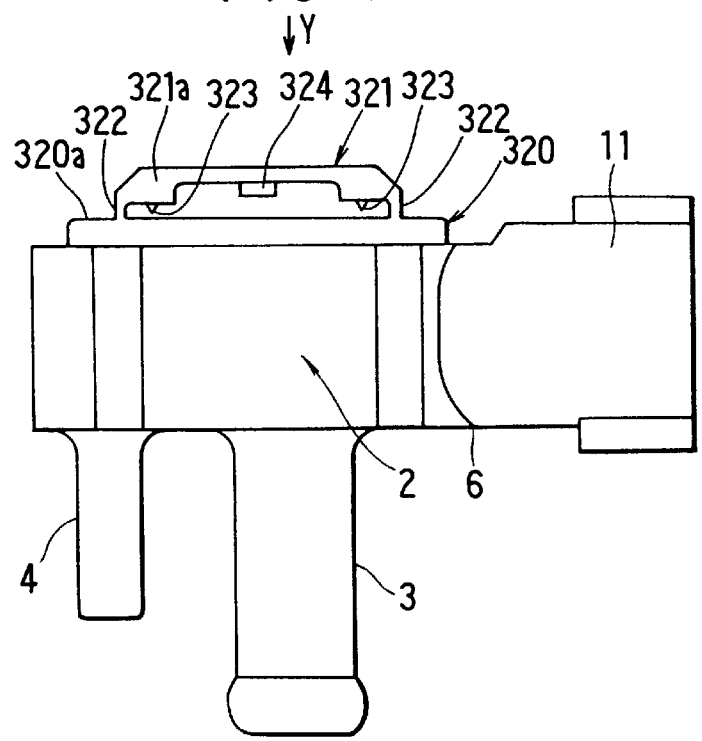
FIG. 10 is a side view showing a pressure sensor device as a second embodiment of the present invention.
Figure 11A:
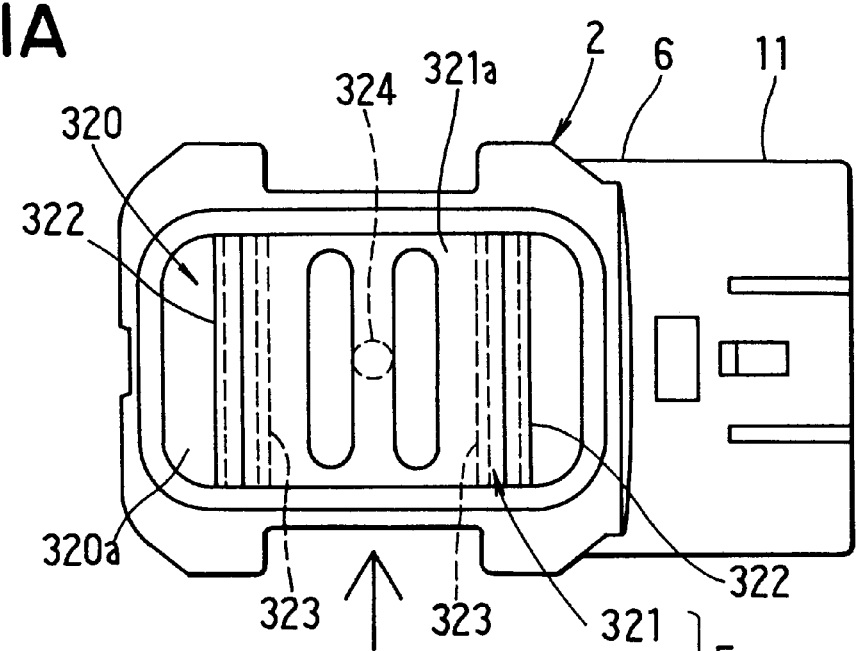
FIG. 11A is a top view showing the sensor device shown in FIG. 10.
Figure 11B:
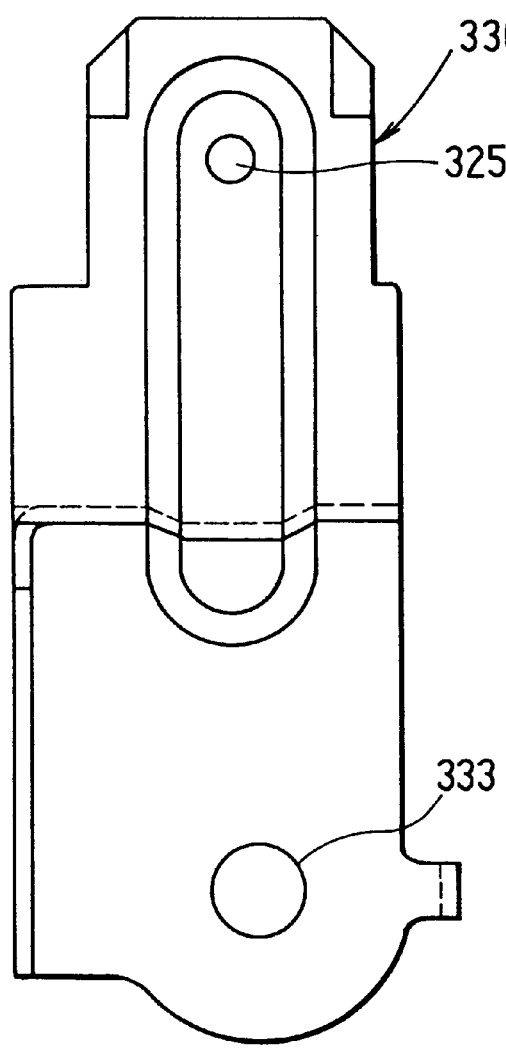
FIG. 11B is a plan view showing a bracket to be inserted into the sensor device shown in FIG. 11A from a direction of an arrow.

Referring to FIGS. 10–12, a second embodiment of the present invention will be described. In this embodiment, only the connecting member 21 and the bracket 30 of the first embodiment are modified, and other structures are the same as those of the first embodiment. FIG. 10 shows a side view of the second embodiment, a bracket 330 being removed. FIG. 11A is a top view of a cover 320 which is fixed to the sensor portion 2, and FIG. 11B is a top view of a bracket 330 to be inserted into the cover 320 from a direction of an arrow shown therein. FIG. 12 is a perspective view showing the cover 320 having a connecting member 321 formed thereon.

As shown in FIG. 10, a connecting member 321 consisting of an upper plate 321a and a pair of bridging portions 322 is formed on and integrally with the cover 320. The upper plate 321a is positioned in parallel with a cover plate 320a with a space therebetween, and is connected to the cover plate 320a by the pair of bridging portions 322 at both sides thereof. The cover 320 and the connecting member 321 are integrally made of s synthetic resin such as a PBT resin with 30% glass filler. The bridging portion 322 corresponds to the bridging portion 22 of the first embodiment, and has a fragile structure so that it first breaks off when a predetermined level of a collision impact is imposed on the sensor device. At the center of the upper plate 321a, a projection 324 which fits with a hole or depression 325 made on the bracket 330 (shown in FIG. 11B) is formed. A pair of triangular ribs 323 extending in a direction of bracket insertion are formed on the upper plate 321a, so that the bracket 330 is lightly press-fitted in the space between the upper plate 321a and the cover plate 320a.

The bracket 330 shown in FIG. 11B is made of an iron plate, and has a mounting hole 333 through which a bolt is inserted to mount the sensor device on the mounting body. The bracket 330 is slidably inserted into the space in the cover 320 in the direction of the arrow shown in FIG. 11A, and is connected to the cover 320 by inserting the projection 324 into the fastening hole or depression 325. Additional connecting strength is given by press-fitting the triangular ribs against the bracket 330. A width "A" of the connecting member 321, shown in FIG. 12, is made sufficiently wide to obtain a required connecting force.

Since the bridging portions 322 are made fragile to break off when a predetermined collision impact is imposed on the sensor device in the same manner as in the first embodiment, the sensor portion 2 is separated form the bracket 330 and the inlet port 3 and other structures are protected from being damaged upon an accidental collision. In addition, since the inlet port 3 is located at an opposite position to the connecting member 321, the inlet port 3 is surely protected from damage.

A relation between stress imposed on the bridging portion 322 and the width A of the bridging portion is analyzed under simulation. A model of such simulation is shown in FIG. 13A, in which the thickness of the bridging portion 322 is set at 0.6 mm, and the width A is varied in a range from 17 mm to 7 mm. An external force 20 kgf is applied to the bridging portion 322 in a direction shown in FIG. 13A. Results of the simulation analysis are shown in FIG. 13B. A tensile strength of a material forming the housing 6 is 11.9 kgf/mm$^2$, assuming that a PBT resin with 30% glass filler is used as the material. Therefore, if a maximum main stress of the bridging portion 322 is higher than the tensile strength 11.9 kgf/mm$^2$, the bridging portion 322 breaks off first before other structures are damaged. As shown in FIG. 13B, if width A is narrower than 15 mm, this condition is cleared. However, if width A is too narrow, the strength for connecting the bracket 330 to the cover 320 becomes insufficient. Therefore, width A is set at 15 mm and thickness B at 0.6 mm in this particular embodiment.

The sensor device of the second embodiment may be directly mounted on a mounting body without using the bracket. That is, the sensor portion 2 may be mounted on the mounting body via the connecting member 321.

The first and the second embodiments of the present invention may be modified in various ways. For example, it is possible to make a fragile portion on the bracket so that the sensor device can be separated from the bracket at the fragile portion when an excessive impact is imposed thereon. Such fragile portion may be mode both on the bracket and on the mounting member. The sensor device may be attached to the bracket by means of magnetic force. In this case, a magnet may be mounted on the sensor cover. However, the magnet has to be disposed not to affect operation of the pressure-responsive element, or the sensor portion may have to be magnetically shielded. The sensor device may be connected to the bracket by means of an interlocking key, connection of which is released upon a collision impact. Though the connecting member is made apart from the inlet port in both embodiments described above, it may be possible to form a mushroom-shaped projection on a periphery of the inlet pipe, so that the sensor device is connected to the bracket via the projection and such connection is released upon a collision impact. The present invention is applicable not only to the pressure sensor to be mounted on a moving vehicle such as an automobile, a vessel or an aircraft but also to the pressure sensor to be used in a stationary device such as a home gas supplying device. When the pressure sensor of this invention is used in the stationary device, the inlet port for introducing gas pressure is protected from an excessive impact caused by an earthquake.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A pressure sensor device comprising:

a sensor portion having a pressure-responsive element for measuring pressure;

an inlet port for introducing pressure to be measured into the sensor portion, the inlet port being connected to the sensor portion; and a mounting member for mounting the sensor device on a vehicle, the mounting member including a connecting member for connecting the sensor portion to the mounting member and being disposed apart from the inlet port, the connecting member having a structure constructed and arranged to break before the inlet port breaks to separate the sensor portion from the mounting member when a predetermined level of impact is imposed on the sensor portion, thereby protecting the inlet port from being damaged by the impact.

2. The pressure sensor device as in claim 1, wherein;

the connecting member includes a bridging portion having structure constructed and arranged to break before the inlet port breaks.

3. The pressure sensor device as in claim 2, wherein:

the inlet port and the bridging portion are tubular pipes made of the same material; and an outer diameter of the bridging portion is smaller than that of the inlet port.

4. The pressure sensor device as in claim 1, wherein:

the mounting member further includes a bracket that is connected to the sensor portion via the connecting member.

5. The pressure sensor device as in claim 4, wherein:

the sensor portion comprises a housing having a cavity for containing the pressure-responsive element therein and a cover for hermetically closing the cavity;

the connecting member is integrally formed with the cover, and comprises a bridging portion projected from the cover and a head connected to the bridging portion;

the bracket has an opening through which the head of the connecting member is inserted; and the bracket is connected and fixed to the cover via the connecting member by first inserting the head of the connecting member into the opening of the bracket and then rotating the bracket around the bridging portion.

6. The pressure sensor device as in claim 5, wherein:

the cover includes a pair of stubs sticking out therefrom;

the bracket further includes a pair of arcuate openings for accommodating and fixing the pair of stubs therein;

the pair of stubs are inserted into the pair of arcuate openings at the same time the head of the connecting member is inserted into the opening of the bracket; and the pair of stubs and the pair of arcuate openings are securely fastened with each other when the bracket and the cover is connected by rotating the bracket around the bridging portion.

7. The pressure sensor device as in claim 1, wherein:

the sensor portion comprises a housing having a cavity in which the pressure-responsive element is disposed and a cover hermetically closing the cavity;

the mounting member further includes a bracket for mounting the sensor device on the mounting body; and the connecting member is formed integrally with the cover.

8. The pressure sensor device as in claim 7, wherein:

the inlet port is connected to one end surface of the housing, and the cover is fixed to the other end surface of the housing.

9. A pressure sensor device, comprising;

a sensor portion having a pressure-responsive element for measuring pressure comprising a housing having a cavity in which the pressure-responsive element is disposed and a cover hermetically closing the cavity;

an inlet port for introducing pressure to be measured into the sensor portion, the inlet port being connected to the sensor portion, wherein the inlet port is connected to one end surface of the housing, and the cover is fixed to the other end surface of the housing; and a mounting member for mounting the sensor device on a vehicle including a connecting member having a structure constructed and arranged to break before the inlet port breaks to separate the sensor portion from the mounting member when a predetermined level of impact is imposed on the sensor portion, thereby protecting the inlet port from being damaged by the impact, and further including a bracket for mounting the sensor device on the mounting body, the connecting member being integrally formed with the cover, wherein the connecting member comprises an upper plate and bridging portions that connect the upper plate to the cover at both sides of the upper plate, so that the upper plate is disposed with a space between the upper plate and the cover, wherein the bracket is inserted in the space of the connecting member and fixed thereto, and wherein the bridging portions break off when the predetermined level of impact is imposed on the sensor portion.

10. The pressure sensor device as in claim 9, wherein:

the upper plate includes a projection, and the bracket has a depression to be engaged with the projection; and the bracket is fixed to the cover via the connecting member by fixedly inserting the projection into the depression.

11. A pressure sensor device, comprising:

a sensor portion having a pressure-responsive element for measuring pressure;

an inlet port for introducing pressure to be measured into the sensor portion, the inlet port being connected to the sensor portion; and a mounting member for mounting the sensor portion on a vehicle, the mounting member including a connecting member for connecting the sensor portion to the mounting member and having structure constructed and arranged to fracture before the inlet port.

12. The pressure sensor device as in claim 11, wherein:

the inlet port is a tubular pipe;

the connecting member includes a tubular pipe made of the same material as that of the inlet port; and an outer diameter of the tubular pipe of the connecting member is smaller than that of the inlet port.

13. The pressure sensor device as in claim 6, wherein:

the head of the connecting member includes triangular ribs that are closely pressed against the bracket to enhance close connection of the bracket and the cover.

14. The pressure sensor device as in claim 10, wherein:

the upper plate includes a pair of triangular ribs extending in a direction of bracket insertion and being pressed against the bracket to enhance close connection of the bracket and the cover.

15. The pressure sensor device as in claim 1, further comprising a conduit for connecting the inlet port to a fuel tank of the vehicle, such that a vapor pressure is introduced from the fuel tank through the conduit to the sensor portion for measuring.

16. The pressure sensor device as in claim 11, further comprising a conduit for connecting the inlet port to a fuel tank of the vehicle, such that a vapor pressure is introduced from the fuel tank through the conduit to the sensor portion for measuring.

17. The pressure device according to claim 2, wherein a wall thickness of the inlet port is greater than a wall thickness of the bridging portion so as to permit the bridging portion to fracture before the inlet port.

* * * * *